(12) United States Patent
Brennan et al.

(10) Patent No.: US 7,519,466 B2
(45) Date of Patent: Apr. 14, 2009

(54) CAM PHASER COMPENSATION IN A HYBRID VEHICLE SYSTEM

(75) Inventors: Daniel G. Brennan, Brighton, MI (US); Jeffrey M. Kaiser, Highland, MI (US); Bryan R. Snyder, Waterford, MI (US); Gregory J. York, Fenton, MI (US); Anne M. Shields, Ann Arbor, MI (US); Leonard G. Wozniak, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 156 days.

(21) Appl. No.: 11/801,128

(22) Filed: May 8, 2007

(65) Prior Publication Data

US 2008/0281496 A1    Nov. 13, 2008

(51) Int. Cl.
  *F02D 28/00* (2006.01)
  *G06F 19/00* (2006.01)
  *F01L 1/34* (2006.01)
(52) U.S. Cl. ............ 701/103; 123/90.17; 123/352
(58) Field of Classification Search ......... 701/101–103, 701/106, 111, 110, 114, 115; 123/345–352, 123/399, 90.17, 90.18; 180/65.2, 65.4
See application file for complete search history.

(56) References Cited

U.S. PATENT DOCUMENTS

| | | | | |
|---|---|---|---|---|
| 6,308,671 | B1 * | 10/2001 | Reed et al. | 123/90.15 |
| 6,704,638 | B2 * | 3/2004 | Livshiz et al. | 701/102 |
| 7,000,589 | B2 * | 2/2006 | Matthews et al. | 123/350 |
| 7,021,282 | B1 * | 4/2006 | Livshiz et al. | 123/347 |
| 7,198,029 | B1 * | 4/2007 | Wong et al. | 123/350 |
| 7,206,687 | B1 * | 4/2007 | Huseman | 701/102 |
| 7,278,383 | B2 * | 10/2007 | Kamiyama et al. | 123/48 C |
| 7,440,838 | B2 * | 10/2008 | Livshiz et al. | 701/103 |

OTHER PUBLICATIONS

U.S. Appl. No. 11/531,545, filed Sep. 13, 2006.

* cited by examiner

*Primary Examiner*—Willis R. Wolfe, Jr.
*Assistant Examiner*—Johnny H. Hoang

(57) ABSTRACT

A method of regulating a torque output of an internal combustion engine in a hybrid electric vehicle includes determining whether a cam phaser system of the engine is in one of an inactive state and an active state and monitoring at least one engine operating parameter. An engine torque array is selected from a plurality of engine torque arrays based on the one of the inactive state and the active state. An available engine torque is determined based on the engine torque array and the at least one engine operating parameter and the engine is regulated based on the available engine torque.

21 Claims, 3 Drawing Sheets

CAM PHASER COMPENSATION IN A HYBRID VEHICLE SYSTEM

FIELD

The present disclosure relates to vehicles, and more particularly to cam phaser compensation in a hybrid vehicle including multiple control modules.

BACKGROUND

Traditionally, vehicles include multiple systems that regulate overall operation of the vehicle. For example, the vehicle includes a power plant or torque source (e.g., an internal combustion engine and/or an electric machine) that generates drive torque, an energy storage device (e.g., battery pack) that provides electrical energy, a transmission that distributes the drive torque to driven wheels and various other systems. Each of the systems includes an associated control module or modules that communicate with one another to regulate operation of the vehicle.

In some vehicle systems, such as a hybrid vehicle system, an engine control module (ECM) and a hybrid control module (HCM) are provided as part of a distributed controller system. To optimize the mix of electric motor and engine torque to meet driver demand, while also minimizing fuel consumption, the HCM, or optimizer control module, must know the torque available from both the electric motor and the engine at any given point in time. If the engine includes a camshaft phaser, the torque available from the engine can strongly depend on the ability of the phaser to move the camshaft.

In a distributed controller system, if the estimated available engine torque is calculated in a controller other than the optimizer control module, there is a time period required to communicate the calculated available torques to the optimizer control module. Because the cam phaser can almost instantly switch from disabled to enabled and vice-versa, there can be a period of uncertainty about the actual available torque from the engine. This could result in suboptimal transmission gear selection and/or unreasonable delay in allowing full powertrain torque development, for example.

SUMMARY

Accordingly, the present disclosure provides a method of regulating a torque output of an internal combustion engine in a hybrid electric vehicle. The method includes determining whether a cam phaser system of the engine is in one of an inactive state and an active state and monitoring at least one engine operating parameter. An engine torque array is selected from a plurality of engine torque arrays based on the one of the inactive state and the active state. An available engine torque is determined based on the engine torque array and the at least one engine operating parameter and the engine is regulated based on the available engine torque.

In other features, the method further includes updating the engine torque array when the cam phaser system is in the active state. The method further includes determining an actual available engine torque based on engine operating parameters and updating the engine torque array based on the actual available engine torque.

In another feature, the method further includes adjusting the available engine torque based on at least one of an ambient temperature and an ambient pressure.

In another feature, the method further includes determining a desired camshaft position and determining an actual camshaft position. Whether the cam phaser system is in one of the inactive state and the active state is determined based on the desired camshaft position and the actual camshaft position.

In still another feature, the method further includes initializing the engine torque array upon a key on event.

In yet another feature, the at least one engine operating parameter includes an engine speed.

BRIEF DESCRIPTION OF THE DRAWINGS

The present disclosure will become more fully understood from the detailed description and the accompanying drawings, wherein.

DETAILED DESCRIPTION

Figure 1:
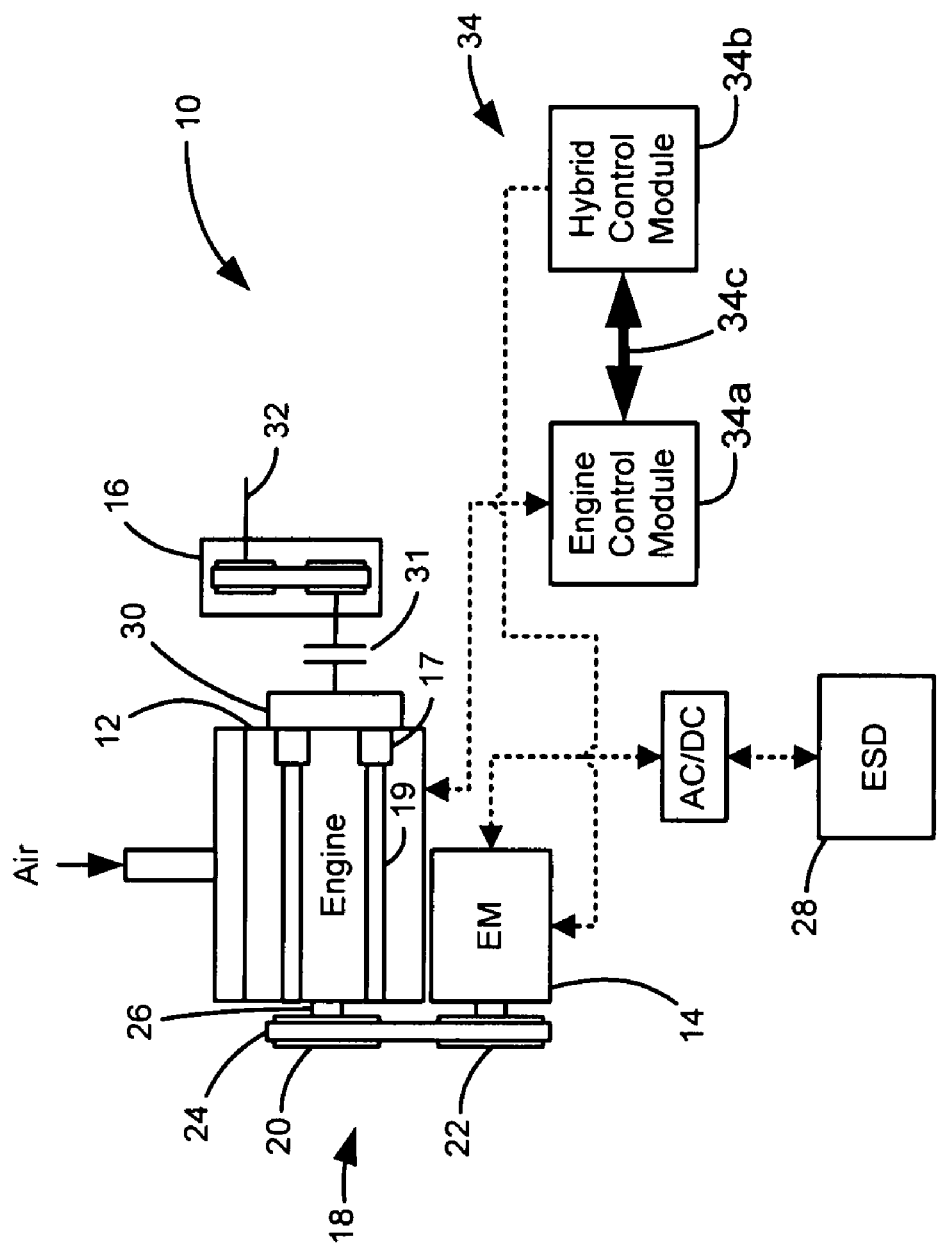
FIG. 1 is a functional block diagram of an exemplary vehicle system that includes torque sources, which are regulated based on the cam phaser compensation control of the present disclosure.

The following description is merely exemplary in nature and is in no way intended to limit the disclosure, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the term standard on-board diagnostics (OBD) drive cycle refers to a driving cycle, during which diagnostics are performed on all systems of the vehicle.

Referring now to FIG. 1, an exemplary hybrid vehicle 10 includes an engine 12 and an electric machine 14, which drive a transmission 16. More specifically, the electric machine 14 supplements the engine 12 to produce drive torque to drive the transmission 16. In this manner, fuel efficiency is increased and emissions are reduced. The engine 12 and electric machine 14 are coupled via a belt-alternator-starter (BAS) system 18. More specifically, the electric machine 14 operates as a starter (i.e., motor) and an alternator (i.e., generator) and is coupled to the engine 12 through a belt and pulley system. The engine 12 and the electric machine 14 include pulleys 20,22, respectively, that are coupled for rotation by a belt 24. The pulley 20 is coupled for rotation with a crankshaft 26 of the engine 12.

In one mode, the engine 12 drives the electric machine 14 to generate power used to recharge an energy storage device (ESD) 28. In another mode, the electric machine 14 drives the engine 12 using energy from the ESD 28. The ESD 28 can include, but is not limited to, a battery and/or a super-capacitor. Alternatively, the BAS system 18 can be replaced with a flywheel-alternator-starter (FAS) system (not shown), which includes an electric machine operably disposed between the engine and the transmission or a chain or gear system that is implemented between the electric machine 14 and the crankshaft 26. In still another mode, both the engine 12 and the electric machine 14 drive the crankshaft 26, whereby the electric machine 14 supplements the engine 12, for example.

The engine 12 further includes at least one cam phaser 17, which regulates a rotational position of a camshaft 19 relative to that of the crankshaft 26. More specifically, the camshaft 19 includes one of an intake and exhaust camshaft, which actuates the opening and closing of corresponding intake and exhaust valves (not shown). In a so-called parked position, the cam phaser 17 ensures that the camshaft 19 regulates the opening and closing of the corresponding valves in accordance with a normal combustion process. For example, the camshaft 19 opens the intake valve(s) when the piston is at or near top dead center (TDC) at the beginning of the intake stroke, and closes the intake valve(s) when the piston is at or near bottom dead center (BDC) at the end of the intake stroke and the beginning of the compression stroke.

The cam phaser 17 is operable to adjust the timing of the opening and closing of the valves. For example, the cam phaser 17 can advance or retard the rotational timing of the camshaft 19 from the parked position, which advances or retards the opening and closing of the valve(s) with respect to the position of the piston within the cylinder. By adjusting (i.e., advancing or retarding) the rotational timing of the camshaft 19, the engine torque output can be correspondingly adjusted.

A sensor (not shown) that is associated with the cam phaser 17 monitors the rotational position of the camshaft 19. The sensor generates a signal based on the rotational position of the camshaft 19 and determines whether the cam phaser 17 is active (i.e., adjusting the rotational position of the camshaft from the parked position) or is inactive (i.e., the camshaft is in the parked position). In some cases, the cam phaser 17 includes a locking pin. If the sensor determines that the locking pin is engaged, the cam phaser 17 is deemed inactive because the camshaft 19 is locked in the parked position. If the sensor determines that the locking pin is disengaged, the cam phaser 17 is deemed active because the camshaft 19 is not locked in the parked position and the rotational timing thereof can be adjusted.

Although the transmission 16 is illustrated as a continuously variable transmission (CVT), the transmission 16 can include, but is not limited to, a CVT, a manual transmission, an automatic transmission and an automated manual transmission (AMT). Drive torque is transferred from the engine crankshaft 26 to the transmission 16 through a coupling device 30. The coupling device 30 can include, but is not limited to, a friction clutch or a torque converter depending upon the type of transmission implemented. In the case of a CVT, the coupling device 30 is a torque converter including a torque converter clutch (TCC) 31. The transmission 16 multiplies the drive torque through one of a plurality of gear ratios to drive a driveshaft 32.

A distributed control system 34 regulates operation of the vehicle 10 and includes at least an engine control module (ECM) 34a and a hybrid control module (HCM) 34b that communicate via a controller area network (CAN) bus 34c. It is appreciated that the distributed control system 34 can include additional modules. An exemplary distributed control system is disclosed in commonly assigned and co-pending U.S. patent application Ser. No. 11/531,545, filed Sep. 13, 2006, the disclosure of which is expressly incorporated herein by reference.

The ECM 34a monitors engine operating parameters and provides signals to the HCM 34b via the CAN bus 34c. More specifically, the ECM 34a determines an actual engine torque output and an available engine torque output based on the engine operating parameters including, but not limited to, whether the cam phaser(s) is/are active or inactive. For example, the torque values are determined by processing the engine operating parameters through an engine torque model.

The HCM 34b receives the actual engine torque output and available engine torque output values from the ECM 34a. The HCM 34b also receives engine operating parameters including, but not limited to, whether the cam phaser(s) is/are active or inactive. Furthermore, the HCM 34b receives a signal from a driver input device (e.g., an accelerator pedal) and determines a driver torque demand based thereon. The HCM 34b executes an optimization routine and determines desired output torque values for both the engine 12 and the electric machine 14 to achieve the driver torque demand.

In accordance with the cam phaser compensation control of the present disclosure, the HCM 34b includes pre-programmed torque arrays. More specifically, the HCM 34b includes an active torque array and an inactive torque array stored in non-volatile memory (not shown). When an ignition key is switched to the ON position, the active and inactive torque arrays are initialized with pre-stored values.

Subsequently, the cam phaser control determines whether a cam phaser system of the engine is in one of an inactive state and an active state. More specifically, a position of a cam phaser locking pin can be monitored. If the pin is engaged, the cam phaser is locked and is deemed to be inactive. If the pin is not engaged, the cam phaser is unlocked and is deemed active. Alternatively, the actual rotational position of the camshaft can be compared to a desired camshaft position. If the actual rotational position varies from the desired rotational position by a threshold amount, the cam phaser is deemed active. If the variance between the actual position and the desired position is less than the threshold amount, the cam phaser is deemed inactive.

The cam phaser compensation control monitors at least one engine operating parameter including, but not limited to, engine speed, ambient temperature ($T_{AMB}$) and ambient pressure ($P_{AMB}$). One of the active torque array and the inactive torque array is selected based on whether the cam phaser is in the inactive state or the active state. The cam phaser control determines an available engine torque ($T_{ENGAVAIL}$) based on the engine torque array and the at least one engine operating parameter. It is anticipated that the cam phaser compensation control can compensate $T_{ENGAVAIL}$ based on one or more of the engine operating parameters (e.g., $T_{AMB}$ and/or $P_{AMB}$) to provide a compensated $T_{ENGAVAIL}$.

The engine and the electric machine are regulated based on $T_{ENGAVAIL}$, as determined by the HCM 34b using the inactive or active torque array. The ECM 34a concurrently calculates an actual $T_{ENGAVAIL}$ ($T_{ENGAVACT}$), which is communicated to the HCM 34b via the CAN bus 34c at some point after the HCM 34b has already issued commands based on $T_{ENGAVAIL}$. If the active torque array had been used to determine $T_{ENGAVAIL}$, the HCM 34b compares $T_{ENGAVACT}$ to the $T_{ENGAVAIL}$ value stored in the active torque array, corresponding to the operating parameters used to determine $T_{ENGAVAIL}$ from the active torque array. The HCM 34b subsequently adjusts or updates the $T_{ENGAVAIL}$ value stored in the active torque array based on $T_{ENGAVACT}$. For example, the HCM 34b can overwrite the stored $T_{ENGAVAIL}$ value with the $T_{ENGAVACT}$ value or can adjust the particular $T_{ENGAVAIL}$ value of the array based on a difference between the $T_{ENGAVAIL}$ value and the $T_{ENGAVACT}$ value. In this manner, the HCM 34b updates the initial values of the active torque array, while the vehicle is operating.

Figure 2:
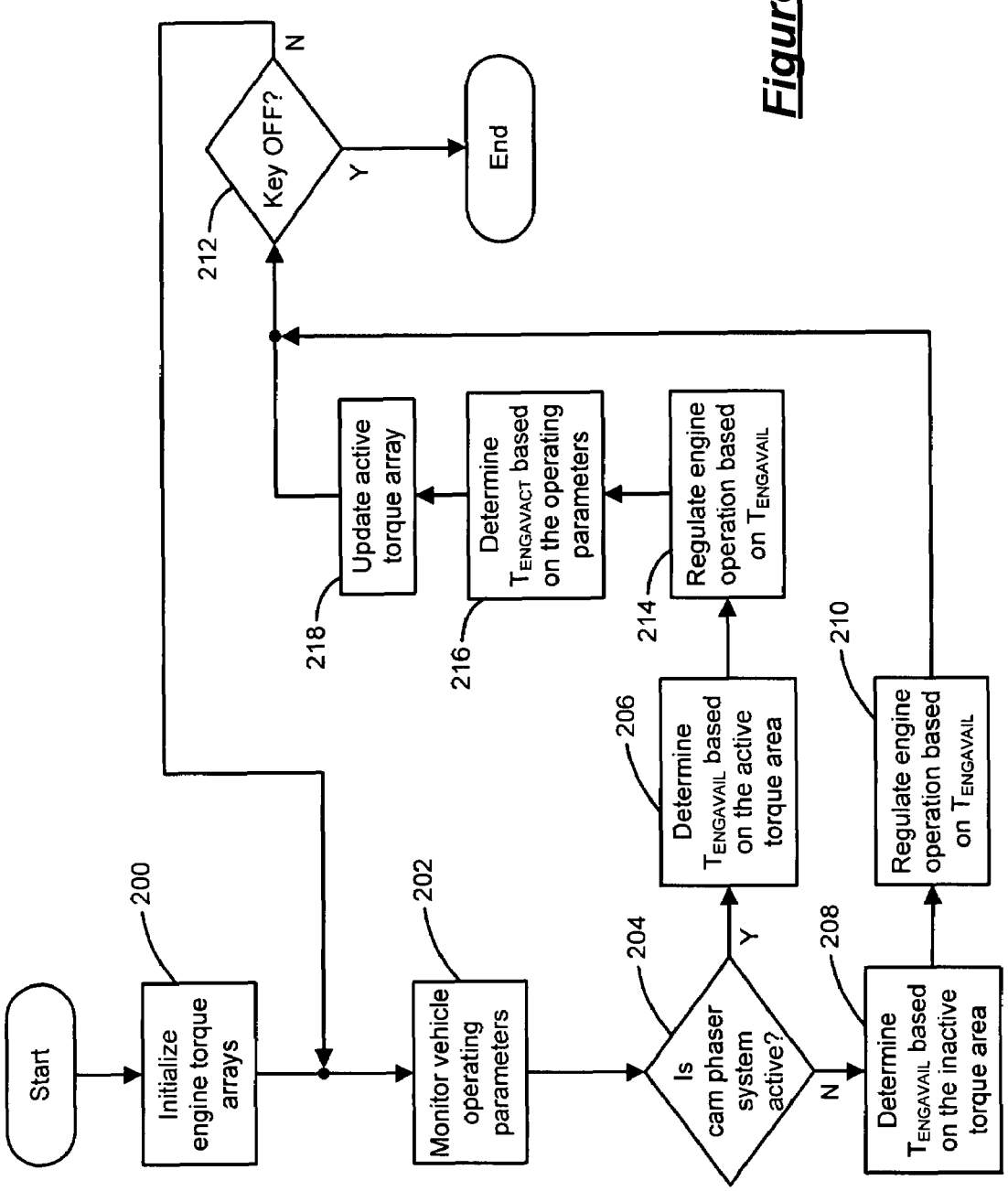
FIG. 2 is a flowchart illustrating exemplary steps that are executed by the cam phaser compensation control.

Referring now to FIG. 2, exemplary steps that are executed by the cam phaser compensation control will be described in detail. In step 200, control initializes the active and inactive torque arrays using torque values that are stored in non-volatile memory. In step 202, control monitors the engine operating parameters. Control determines whether the cam phaser system is active in step 204. If the cam phaser system is active, control continues in step 206. If the cam phaser system is not active, control continues in step 208.

In step 208, control determines $T_{ENGAVAIL}$ based on the inactive torque array, as described in detail above. Control regulates operation of the engine based on $T_{ENGAVAIL}$ in step 210 and continues in step 212. It is anticipated, however, the control can compensate $T_{ENGAVAIL}$ based on $P_{AMB}$ and $T_{AMB}$, as described above, prior to regulating operation of the engine. In step 206, control determines $T_{ENGAVAIL}$ based on the active torque array, as described in detail above. Control regulates operation of the engine based on $T_{ENGAVAIL}$ in step 214. It is anticipated, however, the control can compensate $T_{ENGAVAIL}$ based on $P_{AMB}$ and $T_{AMB}$, as described above, prior to regulating operation of the engine.

In step 216, control determines $T_{ENGAVACT}$ based on the engine operating parameters. Control updates the active torque array based on $T_{ENGAVACT}$ in step 218. In step 212, control determines whether the key position has been switched to OFF. If the key position has not been switched to OFF, control loops back to step 202. If the key position has switched to OFF, control ends.

Figure 3:
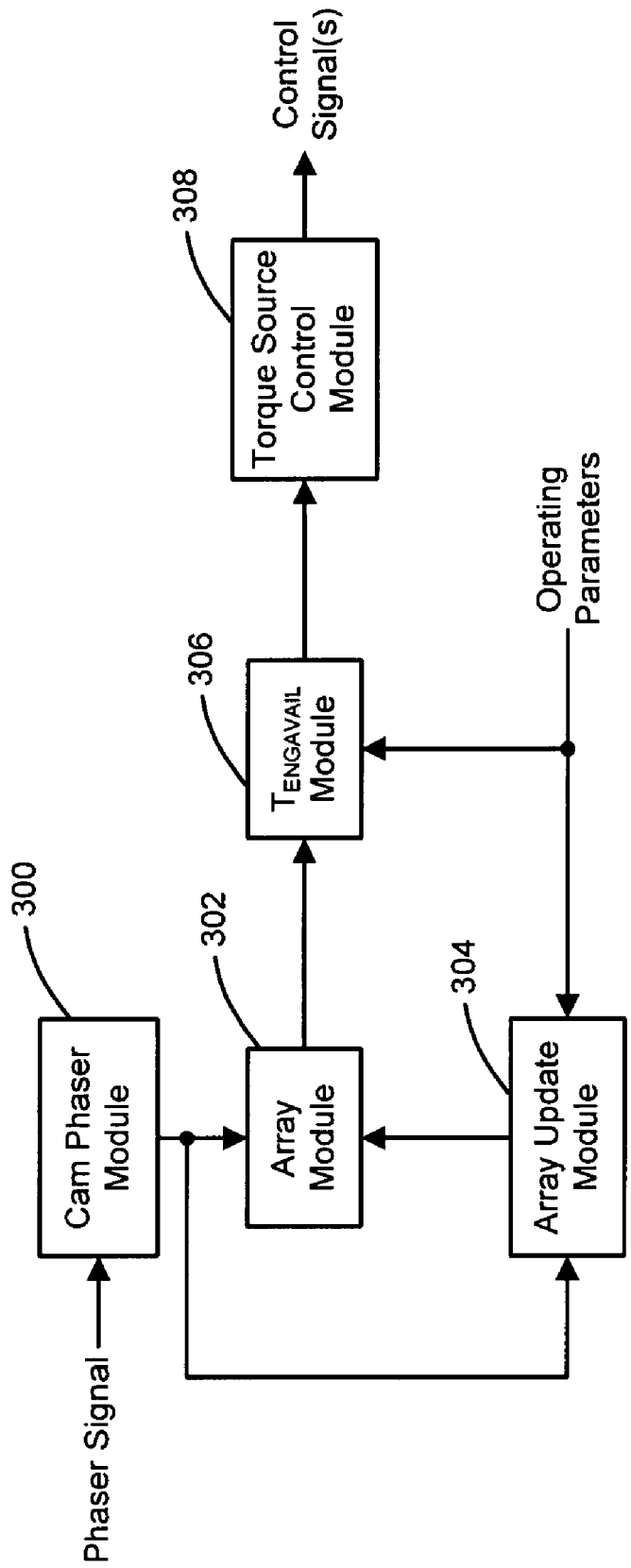
FIG. 3 is a functional block diagram of exemplary modules that execute the cam phaser compensation control.

Referring now to FIG. 3, exemplary modules that execute the cam phaser compensation control will be described in detail. The exemplary modules include a cam phaser module 300, an array module 302, an array update module 304, a $T_{ENGAVAIL}$ module 306 and a torque source control module 308.

The cam phaser module 300 receives a signal from the cam phaser system and determines whether the cam phaser system is in either the inactive state or the active state based thereon. The array module 302 selects one of the inactive torque array and the active torque array based on a signal generated by the cam phaser module 300. The array module 304 generates a signal, which is output to the array module 300, for updating the active torque array based on the engine operating parameters and the signal generated by the cam phaser module 300.

The $T_{ENGAVAIL}$ module 306 determines $T_{ENGAVAIL}$ based on the selected torque array and at least one of the engine operating parameters. It is anticipated that the $T_{ENGAVAIL}$ module 306 can compensate $T_{ENGAVAIL}$ based on $P_{AMB}$ and/or $T_{AMB}$. The torque source control module 308 regulates at least one of the torque sources based on $T_{ENGAVAIL}$.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of regulating a torque output of an internal combustion engine in a hybrid electric vehicle, comprising:
   determining whether a cam phaser system of the engine is in one of an inactive state and an active state;
   monitoring at least one engine operating parameter;
   selecting an engine torque array from a plurality of engine torque arrays based on said one of said inactive state and said active state;
   determining an available engine torque based on said engine torque array and said at least one engine operating parameter; and
   regulating the engine based on said available engine torque.

2. The method of claim 1 further comprising updating said engine torque array when said cam phaser system is in said active state.

3. The method of claim 2 further comprising:
   determining an actual available engine torque based on engine operating parameters; and
   updating said engine torque array based on said actual available engine torque.

4. The method of claim 1 further comprising adjusting said available engine torque based on at least one of an ambient temperature and an ambient pressure.

5. The method of claim 1 further comprising:
   determining a desired camshaft position; and
   determining an actual camshaft position, wherein whether said cam phaser system is in one of said inactive state and said active state is determined based on said desired camshaft position and said actual camshaft position.

6. The method of claim 1 further comprising initializing said engine torque array upon a key on event.

7. The method of claim 1 wherein said at least one engine operating parameter includes an engine speed.

8. A torque control system for regulating a torque output of an internal combustion engine in a hybrid electric vehicle, comprising:
   a first module that determines whether a cam phaser system of the engine is in one of an inactive state and an active state;
   a second module that monitors at least one engine operating parameter and that selects an engine torque array from a plurality of engine torque arrays based on said one of said inactive state and said active state;
   a third module that determines an available engine torque based on said engine torque array and said at least one engine operating parameter; and
   a fourth module that regulates the engine based on said available engine torque.

9. The torque control system of claim 8 wherein said third module updates said engine torque array when said cam phaser system is in said active state.

10. The torque control system of claim 9 further comprising a fifth module that determines an actual available engine torque based on engine operating parameters, wherein said third module updates said engine torque array based on said actual available engine torque.

11. The torque control system of claim 8 wherein said third module adjusts said available engine torque based on at least one of an ambient temperature and an ambient pressure.

12. The torque control system of claim 8 wherein said first module determines a desired camshaft position and determines an actual camshaft position, wherein whether said cam phaser system is in one of said inactive state and said active state is determined based on said desired camshaft position and said actual camshaft position.

13. The torque control system of claim 8 wherein said second module initializes said engine torque array upon a key on event.

14. The torque control system of claim 8 wherein said at least one engine operating parameter includes an engine speed.

15. A method of regulating a torque output of an internal combustion engine in a hybrid electric vehicle, comprising:
   monitoring a driver torque demand;
   determining whether a cam phaser system of the engine is in one of an inactive state and an active state;
   monitoring at least one engine operating parameter;
   selecting an engine torque array from a plurality of engine torque arrays based on said one of said inactive state and said active state;

determining an available engine torque based on said engine torque array and said at least one engine operating parameter; and regulating an electric motor and the engine based on said available engine torque to achieve said driver torque demand.

16. The method of claim 15 further comprising updating said engine torque array when said cam phaser system is in said active state.

17. The method of claim 16 further comprising:

determining an actual available engine torque based on engine operating parameters; and updating said engine torque array based on said actual available engine torque.

18. The method of claim 15 further comprising adjusting said available engine torque based on at least one of an ambient temperature and an ambient pressure.

19. The method of claim 15 further comprising:

determining a desired camshaft position; and determining an actual camshaft position, wherein whether said cam phaser system is in one of said inactive state and said active state is determined based on said desired camshaft position and said actual camshaft position.

20. The method of claim 15 further comprising initializing said engine torque array upon a key on event.

21. The method of claim 15 wherein said at least one engine operating parameter includes an engine speed.

* * * * *